United States Patent [19]

Yamamoto et al.

[11] Patent Number: 5,329,628
[45] Date of Patent: Jul. 12, 1994

[54] DATABASE SYSTEM PROVIDING DIRECT ACCESS FOR READS AND INDIRECT LOCKED ACCESS FOR WRITES AND READS IN WHICH AN ERROR WAS DETECTED IN PREVIOUS ATTEMPT

[75] Inventors: Shoji Yamamoto, Chigasaki; Takashi Sumiyoshi, Yokohama, both of Japan

[73] Assignee: Hitachi, Ltd., Tokyo, Japan

[21] Appl. No.: 644,910

[22] Filed: Jan. 23, 1991

[30] Foreign Application Priority Data

Jan. 29, 1990 [JP] Japan ................................ 2-16025

[51] Int. Cl.⁵ ...................... G06F 12/00; G06F 15/40
[52] U.S. Cl. .................................. 395/425; 395/600;
395/725; 364/967; 364/969; 364/974;
364/DIG. 2
[58] Field of Search ............... 395/600, 750, 700, 425,
395/800, 700, 725; 364/200, 900, DIG. 1, DIG.
2; 370/60, 58.2

[56] References Cited

U.S. PATENT DOCUMENTS

| | | | |
|---|---|---|---|
| 4,434,464 | 2/1984 | Suzuki et al. | 364/200 |
| 4,764,865 | 8/1988 | Temple, III | 364/200 |
| 4,876,643 | 10/1989 | McNeill et al. | 364/200 |
| 4,961,139 | 10/1990 | Hong et al. | 364/200 |
| 4,975,833 | 12/1990 | Jinzaki | 364/200 |
| 4,996,687 | 2/1991 | Hess et al. | 371/10.1 |
| 5,084,837 | 1/1992 | Matsumoto et al. | 395/250 |
| 5,101,488 | 3/1992 | Rosenthal et al. | 395/425 |

Primary Examiner—Thomas C. Lee
Assistant Examiner—Paul Harrity
Attorney, Agent, or Firm—Fay, Sharpe, Beall, Fagan, Minnich & McKee

[57] ABSTRACT

A database system includes a database unit for storing a database, a managing processor and a processor. The managing processor manages the database unit and accesses the database unit in response to an inputted particular request. The processor internally generates a request in accordance with a user program, directly accesses the database unit in accordance with the generated request when the generated request is one of first predetermined requests, and outputs the generated request to the managing processor as a particular request when the generated request is one of second predetermined requests. Each of the second predetermined requests incurs a change in contents of the database, and the managing processor updates a log stored in a log unit in accordance with processing for the particular request.

20 Claims, 8 Drawing Sheets

FIG. 1A
PRIOR ART

CTCA : CHANNEL-TO-CHANNEL ADAPTER

DATABASE SYSTEM PROVIDING DIRECT ACCESS FOR READS AND INDIRECT LOCKED ACCESS FOR WRITES AND READS IN WHICH AN ERROR WAS DETECTED IN PREVIOUS ATTEMPT

BACKGROUND OF THE INVENTION

1. Field of the Invention

The present invention relates to a method of effectively sharing a database among processors and a database system therefor, and more particularly, to a database sharing method which is capable of reducing overhead when the database is accessed and a database system therefor.

2. Description of the Related Art

With increasing scale and diversification of a computer system, a multiprocessor system has been employed as such a computer system for purpose of distributing functions, loads and risks. A database system used in the computer system is disclosed, for example, in JP-A-62-204360.

Figure 1A:
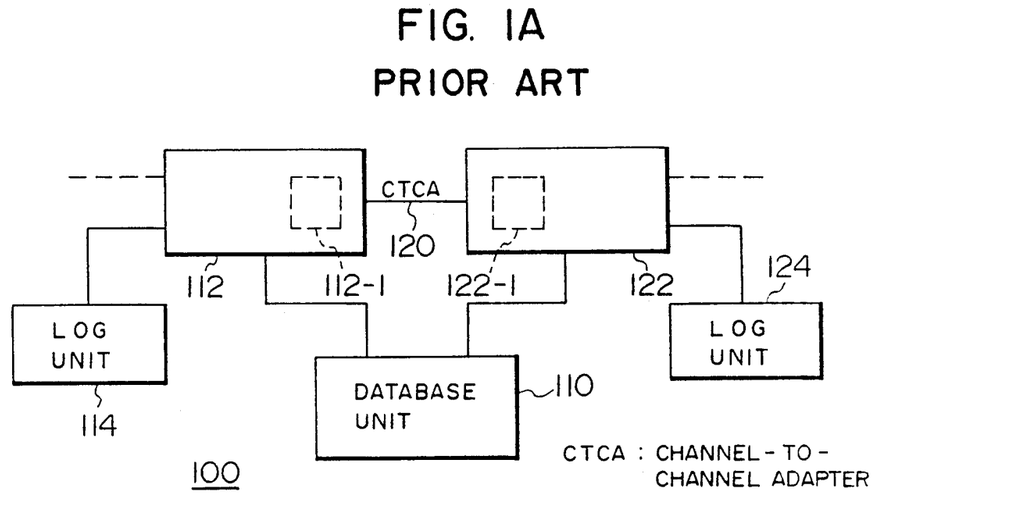
FIGS. 1A and 1B are a block diagram and a flowchart for explaining a structure and operation of a conventional database system, respectively.

A database system 100 shown in the above-cited document, as shown in FIG. 1A, generally includes processors 112 and 122, which are connected to each other through a channel-to-channel adapter (CTCA) 120, share a database unit 110 and are respectively connected to log units 114 and 124. The processors 112 and 122 internally have exclusive control managers 112-1 and 122-1 for performing exclusive control when the database unit 110 is accessed. The unit 110 is unitarily managed by the processor 112 and the processor 122 accesses the unit 110 while exchanging exclusive control information with the processor 112.

Figure 1B:
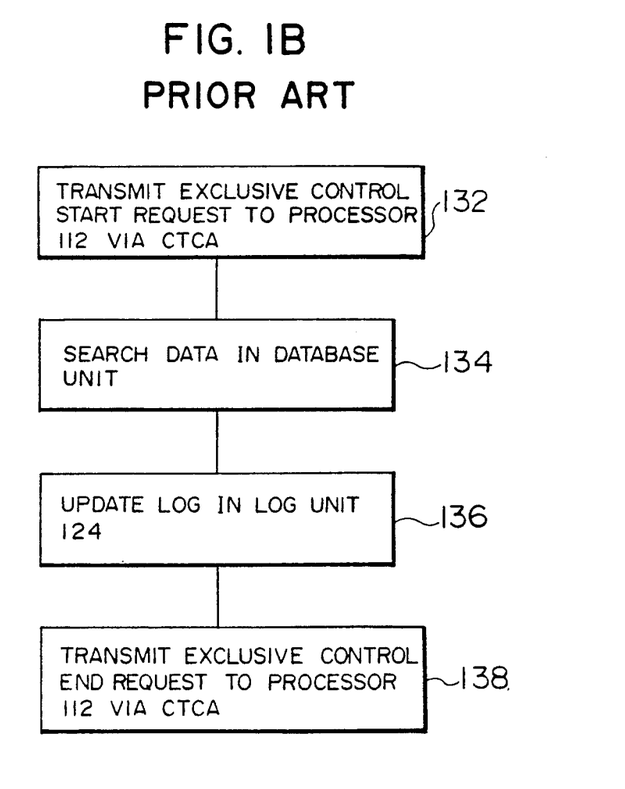

Next, access processing to the unit 110 by the processor 122 will be explained with reference to FIG. 1B, taking processing for searching the unit 100 for data as an example. When access to the unit 110 is needed based on a user program executed by the processor 122, the manager 122-1 first transmits an exclusive control start request to the processor 112 through the CTCA 120 at step 132. The manager 112-1, responsive to the start request, prohibits the processor 112 and other processors from accessing the unit 110 and transmits an access permission to the processor 122. Then, the processor 122, responsive to the access permission, searches the unit 110 for data by accessing the unit 110, at step 134. Subsequently at step 136, a log in the log unit 124 is updated. Next, at step 138, an exclusive control end request is transmitted from the processor 122 to the processor 112 through the CTCA 120. The manager 112-1, responsive to the end request, enables the processor 112 to access the unit 110 based on the user program executed in the processor 112. The above processing is similarly performed for data update processing for the unit 110.

The conventional database system, as mentioned above, implies the following problems relative to a system performance and a system use.

First, the exclusive control is needed even when a processor performs a mere data search operation for a database unit. For this reason, the processor needs to communicate with another processor managing the database unit for the exclusive control, whereby overhead occurring in data search processing is increased compared with a case where a database unit is not shared among a plurality of processors.

Second, in a database system in which data update processing for a database unit is performed by a plurality of processors, since a log of the update processing is stored in a log unit connected to a processor which performs the update processing, it is necessary to merge all the logs stored in a plurality of log units, when the database unit is recovered from an obstacle, or when the database unit stopped for maintenance is connected again to the system. Therefore, complex processing and a long time for recovering the database unit are required.

SUMMARY OF THE INVENTION

The present invention has been made in view of the above problems, and it is an object of the present invention to provide a database sharing method which is capable of reducing overhead when a database unit shared among processors is accessed.

It is another object of the present invention to provide a database sharing method which is capable of omitting an exclusive control according to types of processing performed for a database unit and reducing overhead of a database system.

It is a further object of the present invention to provide a database sharing method which is capable of managing a database unit shared among processors by a particular processor, storing a log updated by processing associated with a writing into the database unit, in a log unit connected to the particular processor and thereby facilitating a recovery of the database unit.

It is a yet further object of the present invention to provide a database system which is capable of fulfilling any of the above methods.

To achieve the above objects, a database system includes a database unit for storing a database, a managing processor and a processor. The managing processor manages the database unit and accesses the database unit in response to an inputted particular request. The processor internally generates a request according to a user program. When the generated request is one of first predetermined requests, the processor directly accesses the database unit in accordance with the generated request. When the generated request is one of second predetermined requests, the processor outputs the generated request to the managing processor as the particular request. Each of the respective second predetermined requests is a request accompanying change in contents of the database or a request associated with the accompanying request, and the managing processor stores the change in a log unit.

According to the present invention, the shared database unit can be directly accessed for mere processing (transaction) for, for example, search for the database, without communication from the processor requesting the search processing to the managing processor, thereby making it possible to ensure an access time substantially equal to a database system in which a database is not shared.

Database update processing is unitarily performed by the managing processor, whereby an update log of the database is acquired only by the managing processor even if update requests are issued to the shared database unit from a plurality of processors. It is not therefore necessary to merge a plurality of logs, as before, when the database is recovered from an obstacle, which results in largely alleviating load of a database manager.

DESCRIPTION OF THE PREFERRED EMBODIMENTS

A database system according to the present invention will hereinafter be explained with reference to the accompanying drawings.

Figure 2:
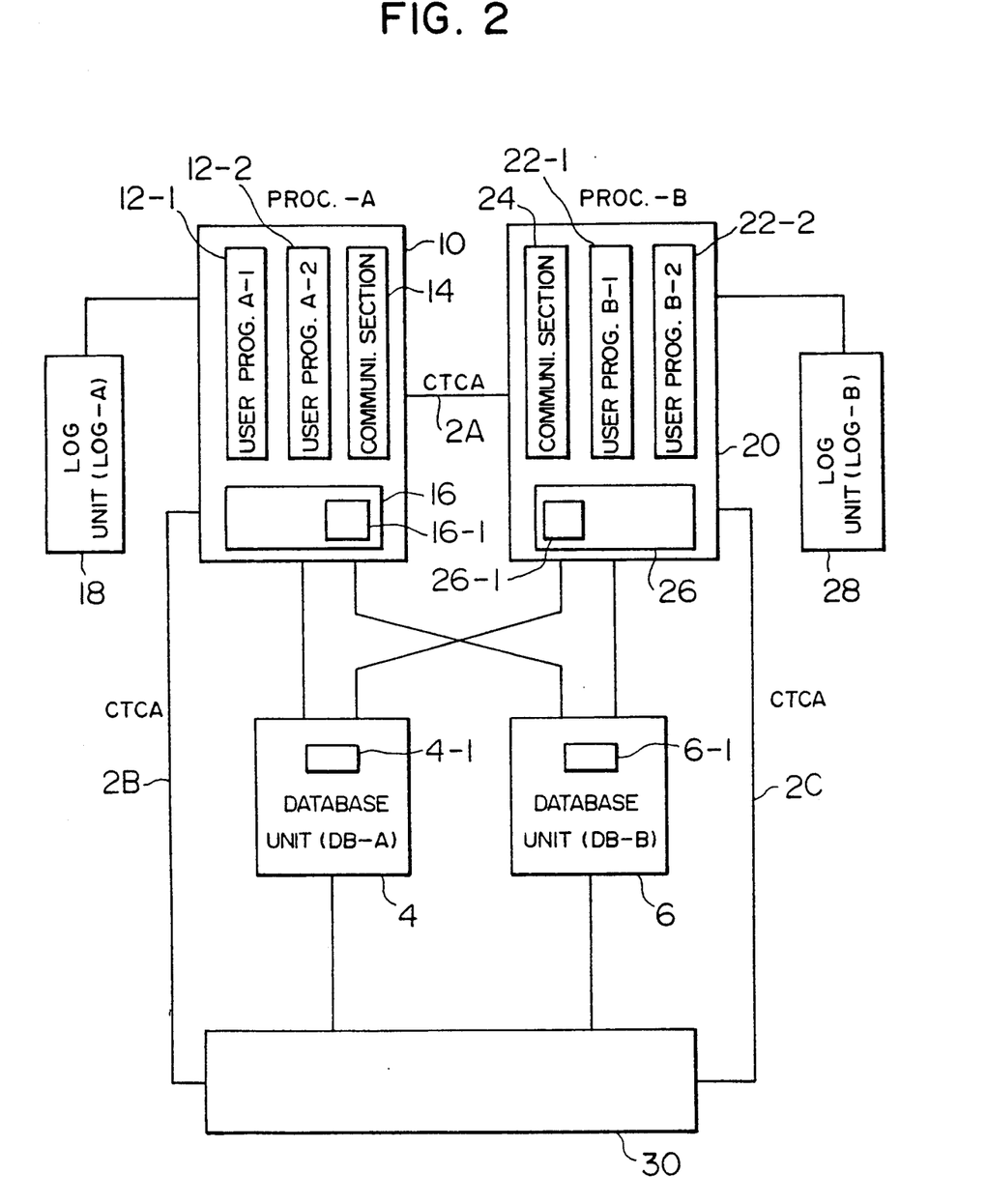
FIG. 2 is a block diagram showing a structure of a database system according to the present invention.

A first embodiment of a database system according to the present invention will be first explained with reference to FIG. 2. In FIG. 2, processors 10, 20 and 30 are coupled to each other through communication units 2A, 2B and 2C such as channel-to-channel adapters (CTCAs). Respective database units 4 and 6 are connected to the processors 10, 20 and 30 and shared thereby. The respective database units 4 and 6 internally have queue areas for queuing requests issued by the respective processors. In this embodiment, the database units 4 and 6 are managed by the processors 10 and 20, respectively. The processors 10 and 20 are connected to log units 18 and 28, respectively.

The processors 10 and 20 respectively include executing sections 12 (12-1, 12-2) and 22 (22-1, 22-2) for executing user programs, communicating sections 14 and 24 and access controlling sections 16 and 26. The processor 30 has the same structure as each of the processors 10 and 20. The respective processors are not necessarily provided with two executing sections and may be provided with one or more than two. The section 12 executes a user program, issues a variety of requests, for example a mere search request, a search request relative to an update request, or an update request, in course of an execution of the user program and outputs issued requests to the section 16. The section 22 performs the same functions as the section 12. The section 14 transmits a request from the section 16 as a message to the processor 20 through the communication unit 2A or receives a message from the processor 20. The section 24 is operated in the same manner as the section 14.

Figure 3:
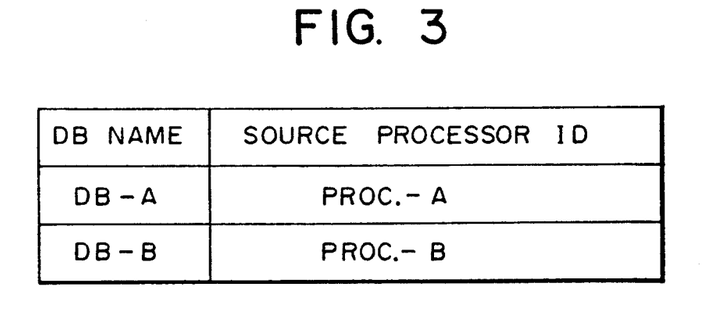
FIG. 3 is a table showing a managing source table which is stored in each access control unit.

The section 16 has a managing source table 16-1 indicating which of the processors the respective database units are managed by. As is apparent from FIG. 3, the units 4 and 6 are managed by the processors 10 and 20, respectively. Also, the section 16, upon receiving a request from the section 12, determines whether or not the request needs an exclusive control. Then, the section 16 also determines whether or not the request has been issued to access the database unit managed by itself.

If the request from the section 12 is, for example, a mere search request, for the unit 4 managed by its own processor and does not need an exclusive control, the section 16 outputs the request to the unit 4 to directly access the unit 4. If the request from the section 12 is, for example, the mere search request for the unit 6 managed by another processor and does not need the exclusive control, the section 16 outputs the request to the unit 6 to directly access the unit 6. If the request from the section 12 is, for example, an update request for the unit 4 which needs the exclusive control, the section 16 performs the exclusive control and then outputs the request to the unit 4 to access the same. If the request from the section 12 is, for example, the update request for the unit 6 which needs the exclusive control, the section 16 transmits the request as a message to the processor 20 through the section 14 and the CTCA 2A. The section 24 determines whether or not the message received from the processor 10 is a request necessary for the exclusive control and causes the section 26 to access the unit 6. The same operation is performed when the search request or the update request is issued from the section 22 to the section 26.

It should be noted that the section 16 performs the exclusive control for reception of requests generated from the section 12-1 and 12-2, in the same manner as before. For example, if an update request is generated by the section 12-1, the section 16 performs the exclusive control for the section 12-2 until commit processing is completed. When the generated request by the section 12-1 is a search request, the exclusive control is performed for the section 12-2 until return processing is completed. However, when it is designated by a user that the exclusive control is not necessary, the section 16 does not perform the exclusive control for one of the sections 12-1 and 12-2 when a search request is generated by the other.

Next, the operation of the database system of the present invention will be conceptionally explained.

In order to reduce overhead upon a data search operation, the data search operation (transaction) is performed without exclusive control for a database to be accessed, whereby the database unit is directly accessed by a source processor which requests the data search operation. Thus, in the present invention, a time required for the data search operation can be reduced to be substantially equivalent to that in a database system where a database unit is not shared among processors.

Upon performing the data search operation without the exclusive control, when an inconsistency is encountered between searched data and control information on a block where the data to be searched for is stored because of a timing of a data update operation performed by another processor, either of the following methods is executed to cope with the inconsistency:

(a) the data search operation is executed at constant time intervals and at a predetermined frequency until the inconsistency is deleted; and (b) the search request for the data search operation is transmitted to the processor managing the database unit to cause the managing processor to execute the data search operation under the exclusive control, or without inconsistency.

Upon recovery of a database unit from an obstacle, database backup information of the database and log information after the backup information has been acquired are required. For a unitary management of the log information, all update processing is executed by the processor managing the database unit. Specifically, when the database unit is to be updated by a processor other than the managing processor, the processor transmits an update request to the managing processor and thereby data in the database unit is updated by the managing processor.

Next, an operation of the first embodiment will be explained with reference to FIGS. 4 to 7.

Figure 4:
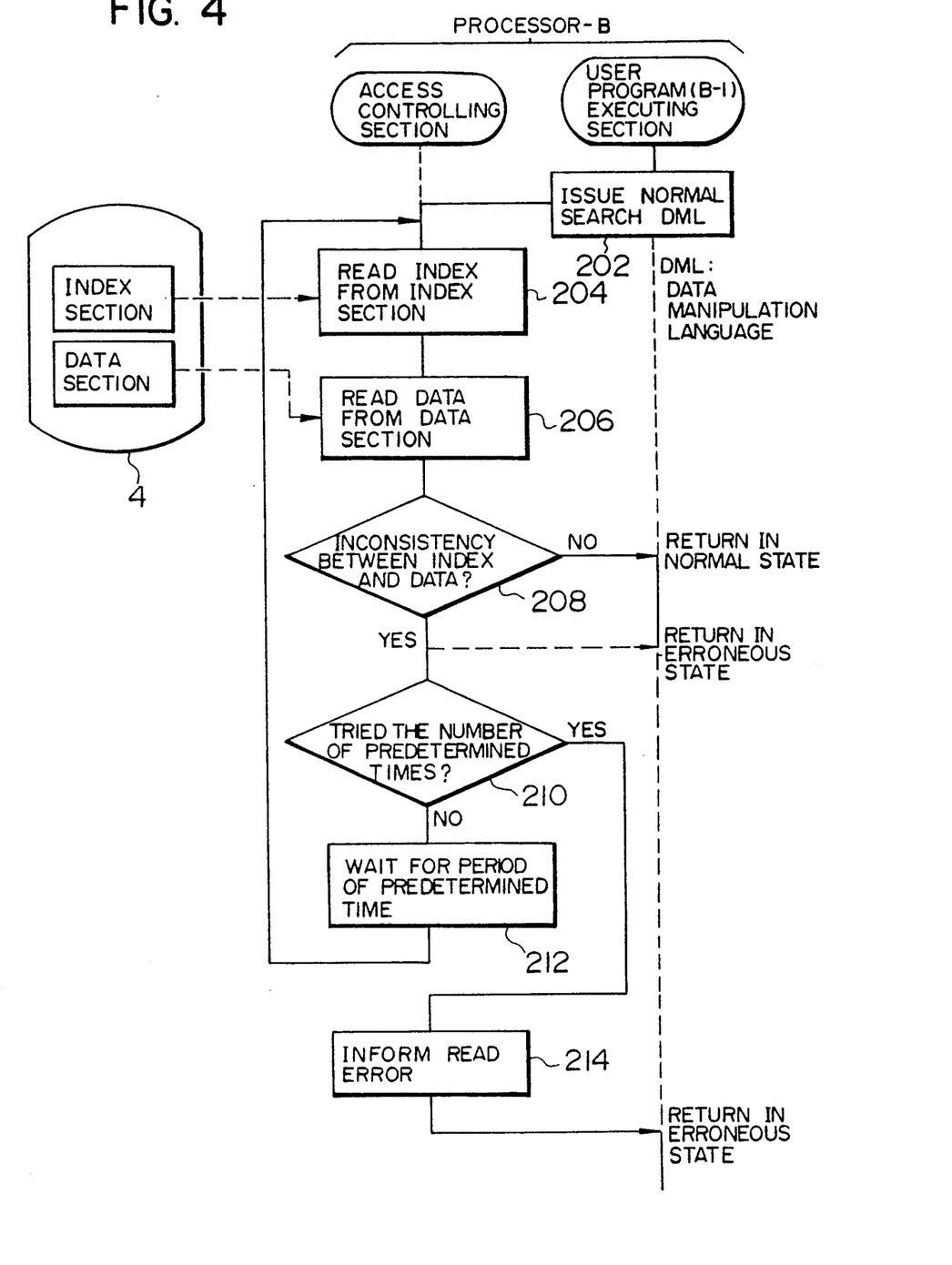
FIGS. 4, 5, 6 and 7 are flowcharts for explaining search processing, search processing relative to update processing, update processing and commit and return processing, respectively.

First, a case where the database unit is accessed only for search processing will be explained with reference to FIG. 4. At step 202, normal search request for the database unit 4 managed by the processor 10 is issued from, for example, the executing section 22-1 of the processor 20 on the basis of a user program. At steps 204 and 206, the database unit 4 is directly accessed by the access controlling section 26 of the processor 20, whereby an index and data are respectively read from an index section and a data section of the unit 4. In this time, the search request from the section 26 is temporarily stored in the queue 4-1 arranged in the unit 4, and the stored requests are executed in the stored order. Since an exclusive control is not performed between the processor 20 and the processors 10, 30, inconsistency between the index from the index section and the data from the data section of the unit 4 may possibly occur depending on a timing with update processing performed by the processor 10 or 30. Thus, when the inconsistency is detected, access to the database is retried at predetermined time intervals and predetermined times at steps 210 and 212 in order to cope with such a subtle timing without the exclusive control. The access operation is repeated until the inconsistency or contradiction due to deviation of the timing is removed. When the inconsistency cannot be removed within the predetermined times of accesses, it is determined that the database unit 4 is permanently destroyed, and a read error is indicated at step 214.

As another example, when the inconsistency is detected at step 208, the search request can be transmitted to the processor 10 such that the search processing the exclusive control is performed by the processor 10, as will be described later.

Next, a method of processing a request which needs exclusive control will be explained with reference to FIG. 8, wherein a banking system is given as an example. In this example, a search request is related to an update request, wherein both requests are integrally regarded as an object of the exclusive control. Also, the actual update processing is executed in response to the update request.

Figure 8:
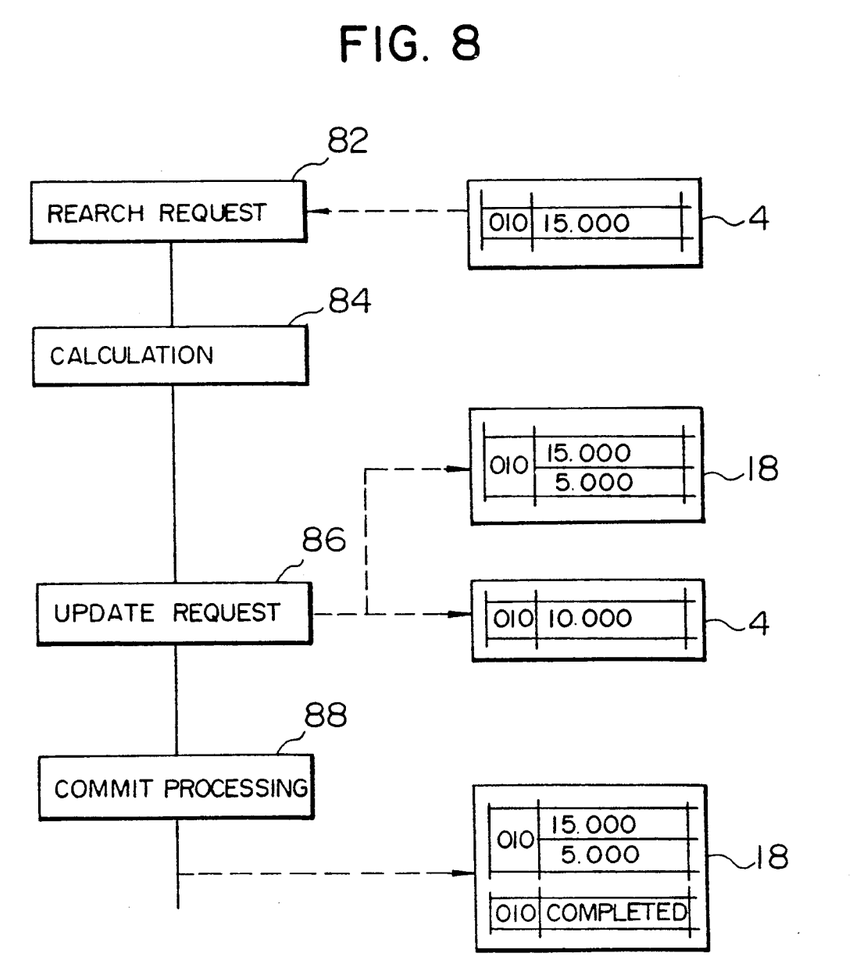
FIG. 8 is an illustration for explaining search processing relative to update processing and the update processing.

FIG. 8 shows a case where a person having the balance of, for example, 15,000 dollars requests a withdrawal of 5,000 dollars to the processor 20 as a cash dispenser. At step 82, the processor 10 as a main computer performs the exclusive control in response to a search request, and balance data at address 010 is read out. Then, a calculation corresponding to the request is effected and the result is announced to the processor 20 at step 84. The processor 20, since the exclusive control is performed, transmits an update request to the processor 10 at step 86 without requesting the exclusive control again. The processor 10 updates the balance data in the database unit 4 and a log and transmits the results to the processor 20. The processor 10, responsive to a commit processing request from the processor 20, executes commit processing and terminates a series of operations for responding to the user's request.

In the above examples, a mere or normal search request can be performed in a short time without exclusive control, and the exclusive control is performed for a search request associated with an update request, whereby consistency of data is maintained in course of a series of operations. However, since the contents of the database are updated in response to an update request, when an obstacle occurs before the operations have been completed, it will take a long time for a database recovery.

Figure 5:
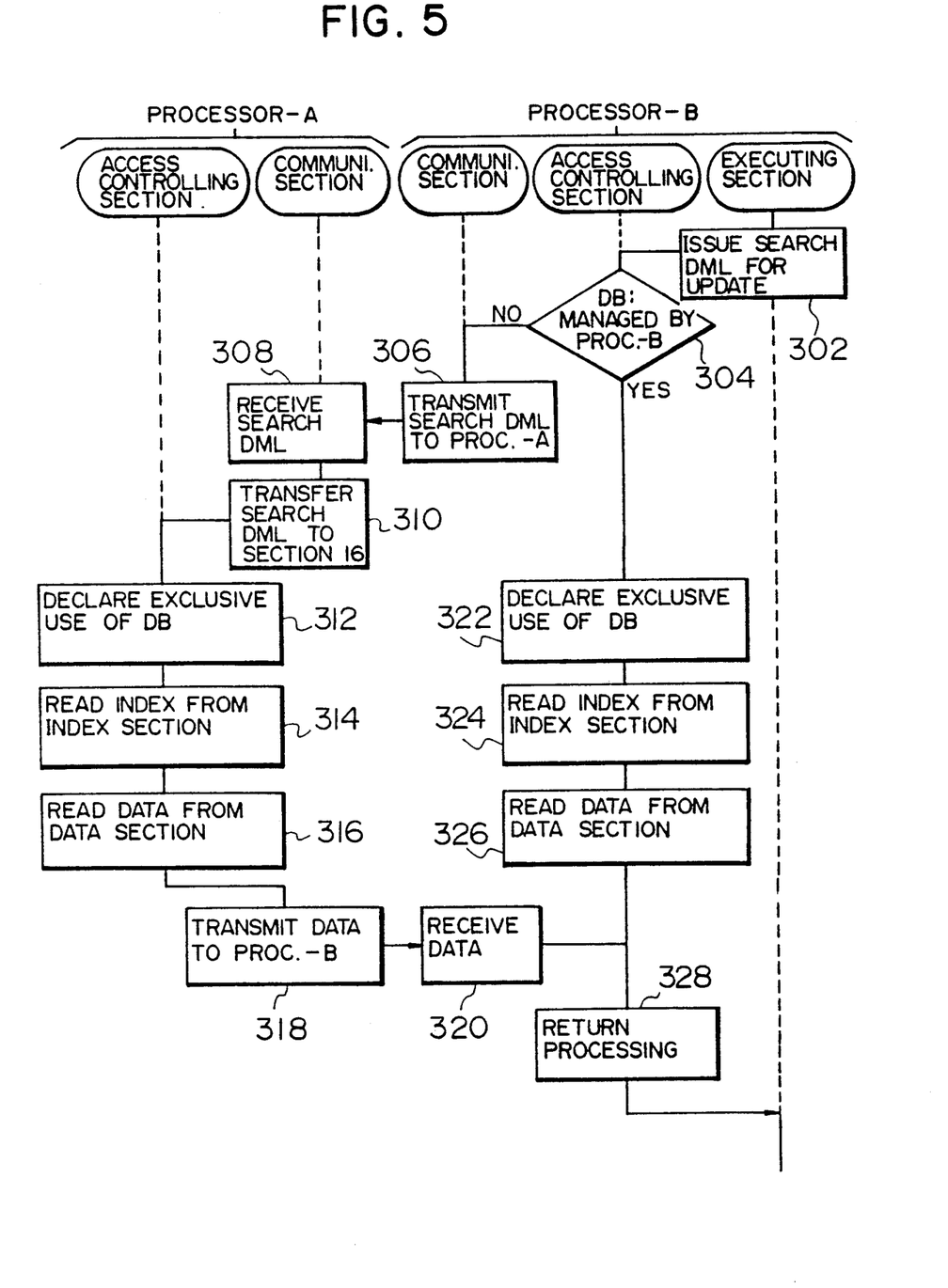
Figure 6:
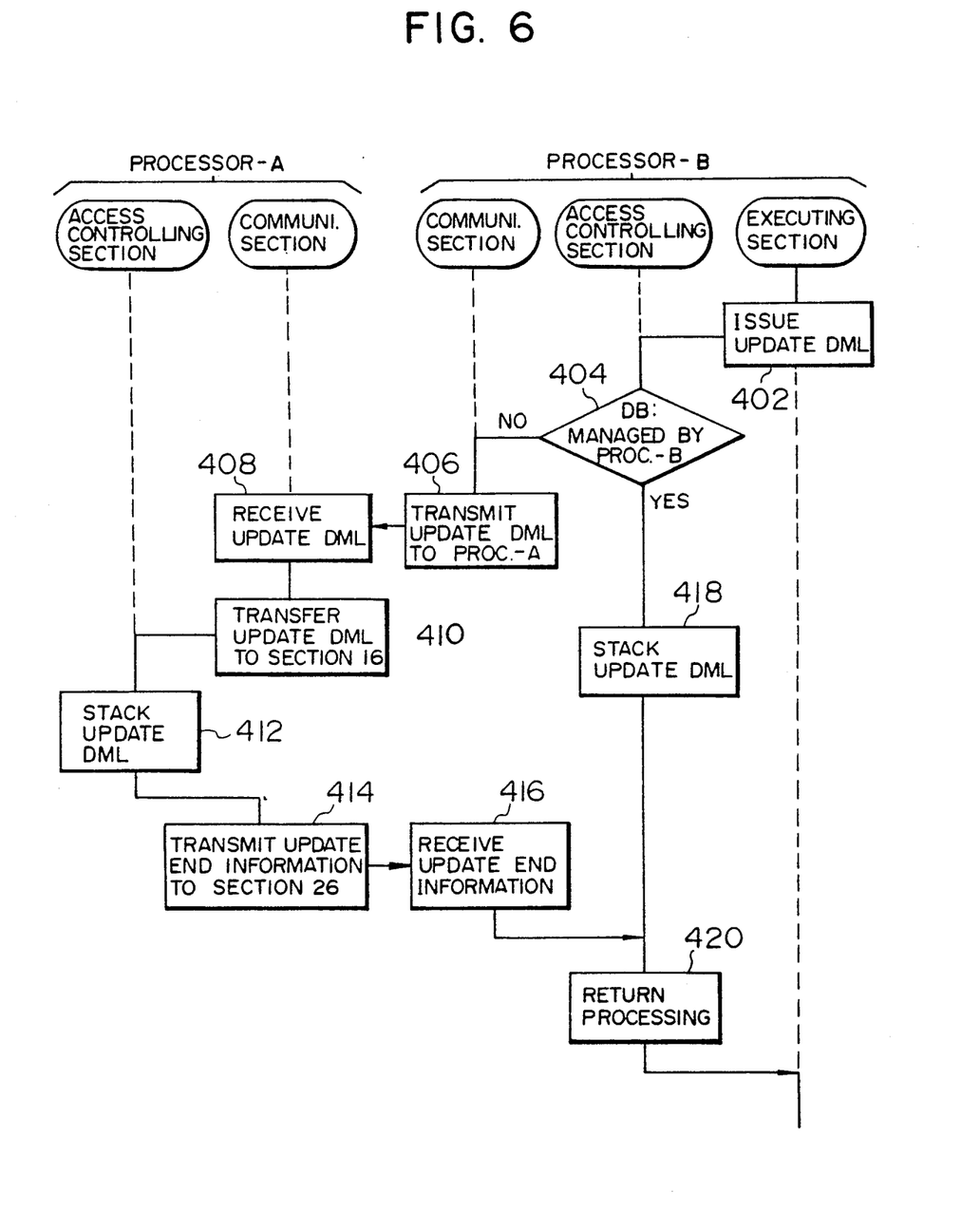
Figure 7:
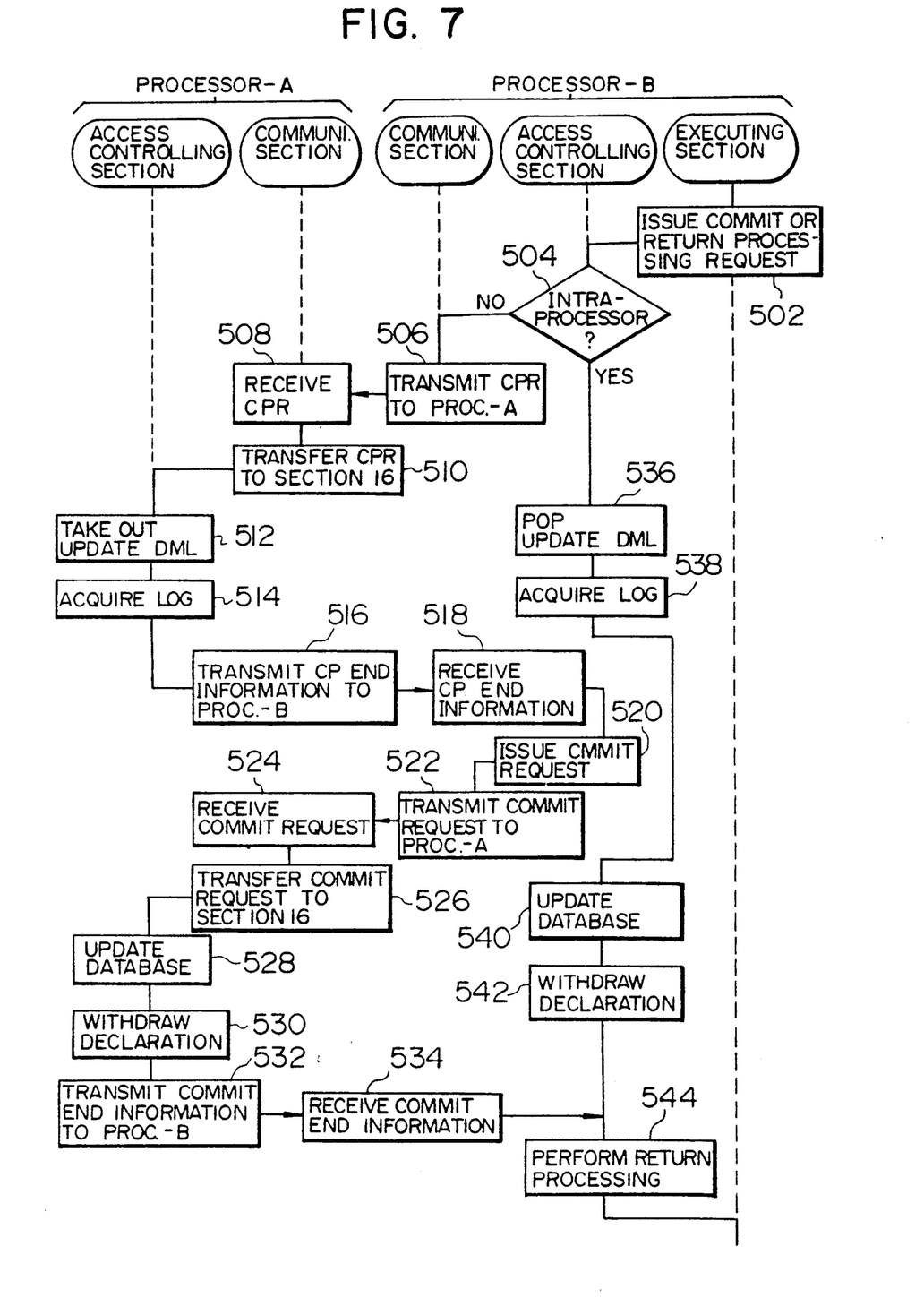

An example of updating the database at a different timing from the above-mentioned example will be explained with reference to FIGS. 5 to 7. In this example, search processing associated with update processing is regarded as an object of the exclusive control, integrally with the update processing.

Assume that the executing section 22-1 of the processor 20 issues a search processing associated with an update processing to the database unit 4 managed by the processor 10 on the basis of a user program at step 302. The access controlling unit 26 of the processor 20, after performing an exclusive control for the other executing section 22-2, determines at step 304 whether or not the database unit to be accessed is the database managed by the processor 20, by referring to the database managing table 26-1. When the search request is issued to access the database unit 4 managed by the processor 10, the request is transmitted as a message to the processor 10 through the communicating section 24 and the CTCA 2A at step 306. The communicating section 14, upon receiving the search request at step 308, transfers the received request to the access controlling section 16 at step 310. The section 16, responsive to the search request received, declares an exclusive use of the unit 4 at step 312 and performs the exclusive control for the sections 12-1, 12-2. Thereafter, the search processing is performed for the unit 4 at steps 314, 316, and an index and data are read from the index section and the data section, respectively. The read data is transmitted to the section 26 through the sections 16, 14, the CTCA 2A and the section 24 at steps 318 and 320. Then, return processing is performed at step 328 such that the data is transferred from the section 26 to the user program executed in the section 22-1 which has issued the request.

When it is determined at step 304 that the search request issued from the section 22-1 is for the unit 6, the same operations as those described at steps 312, 314, 316 are performed by the section 26 for the unit 6 at steps 322, 324, 326. Then, the return processing is performed at step 328 such that data is transferred from the section 26 to the user program executed in the section 22-1 which has issued the request.

Next, a case where an update processing request is issued will be explained with reference to FIG. 6.

In the same manner as the above-mentioned search processing request, when the update processing request is issued from the section 22-1 of the processor 20 on the basis of a user program at step 402, the section 26 determines at step 404 whether or not the request has been issued to access the database unit 6 managed by itself. When it is determined that the request is not issued to the database unit 6 managed by itself, the update request is transmitted from the section 26 to the section 14 of the processor 10 through the section 24 at step 406. The section 14, upon receiving the update request at step 408, transfers the same to the section 16 at step 410 since the exclusive control has already been performed. The section 16 stacks the update request at step 412 and then cause the section 14 to transmit update end information to the section 14 at step 414. Therefore, the database in the unit 4 is not actually accessed at this time. When the section 24 receives the update end information at step 416, the section 26 executes return processing at step 420. When it is determined at step 404 that the update request is issued to access the database unit 6 managed by the processor 20, the update request is stacked at step 418. Then, the return processing is executed at step 420.

Next, an operation performed when a commit processing request is issued from the executing section 22 of the processor 20 on the basis of a user program or when the processing synchronizing point is reached after executing return processing will be explained with reference to FIG. 7.

In the same manner as the update request, a commit preparing request is issued from the section 22-1 of the processor 20 at step 502. The section 26 determines at step 504 whether the commit preparing request is one issued for the processor 20. When it is determined at step 504 that the commit preparing request is for the processor 10, the section 26 causes the section 24 to transmit the request to the section 14. The section 14, upon receiving the commit preparing request at step 508, transfers the same to the section 16 at step 510. Since the exclusive control has already been performed, the section 16 takes out the update request at step 512 and acquires a log in the log unit 18 to update the same. Then, the section 16 causes the section 14 to transmit commit preparation (cp) end information to the section 24 at step 516. When the section 24 receives the end information at step 518, the section 26 issues a commit request at step 520. The commit request is transmitted from the section 24 to the section 16 through the section 14 at steps 522, 524, and 526. The section 16, responsive to the commit request, actually updates the database stored in the unit 4 at step 528 and withdraws the declaration of the exclusive control at step 530. By this operation, the exclusive control set by a search request is withdrawn. Then, at steps 532 and 534, commit end information is transmitted from the section 16 to the section 26, and then return processing is performed at step 544, followed by a termination of a series of operations.

When it is determined at step 504 that the commit processing request is issued for the database unit 6 managed by its own processor 20, the same operations as those performed at steps 512, 514, 528 and 530 are performed by the section 26 at steps 536, 538, 540 and 542.

In this example, the log is acquired by the processor 10 at step 514. Therefore, when the unit 4 is to be recovered from an obstacle, data recovery can be performed by using only the log unit 18 connected to the processor 10. In this manner, a database system according to the present invention can perform an access to a database unit shared among processors at a speed equivalent to an access to a database unit which is not shared. Also, since it is not necessary to merge logs from a plurality of log units upon recovering the database unit from an obstacle, data can be readily recovered.

Figure 9:
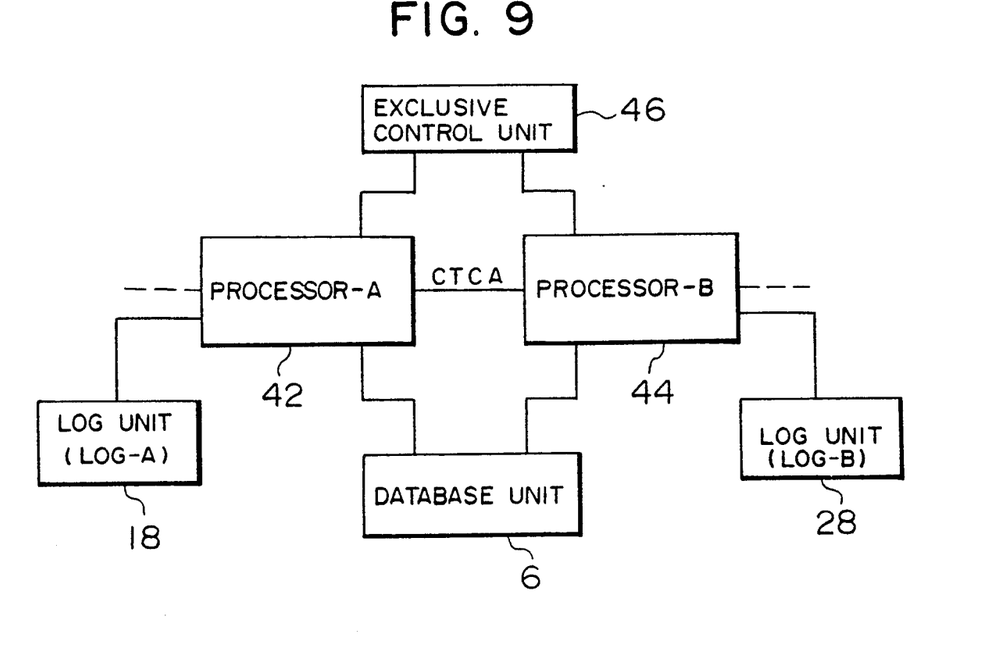
FIGS. 9 and 10 are block diagrams respectively showing second and third embodiments of a database system according to the present invention.

Next, a second embodiment of the present invention will be explained with reference to FIG. 9. In this embodiment, the exclusive control functions for a database unit to be performed by an access controlling section of a processor in the first embodiment are totally provided as an exclusive control unit 46. As for a request which needs the exclusive control, each processor 42 or 44 accesses the unit 6 when an update request is generated internally accesses the database unit 6 after the exclusive control is performed by the unit 46. A request which does not need the exclusive control, for example a mere search request, is outputted to the unit 6 without accessing the section 46. Requests received by the unit 6 are executed in order. In this embodiment, though the log is not unified, overhead when the database unit is accessed can be reduced.

Figure 10:
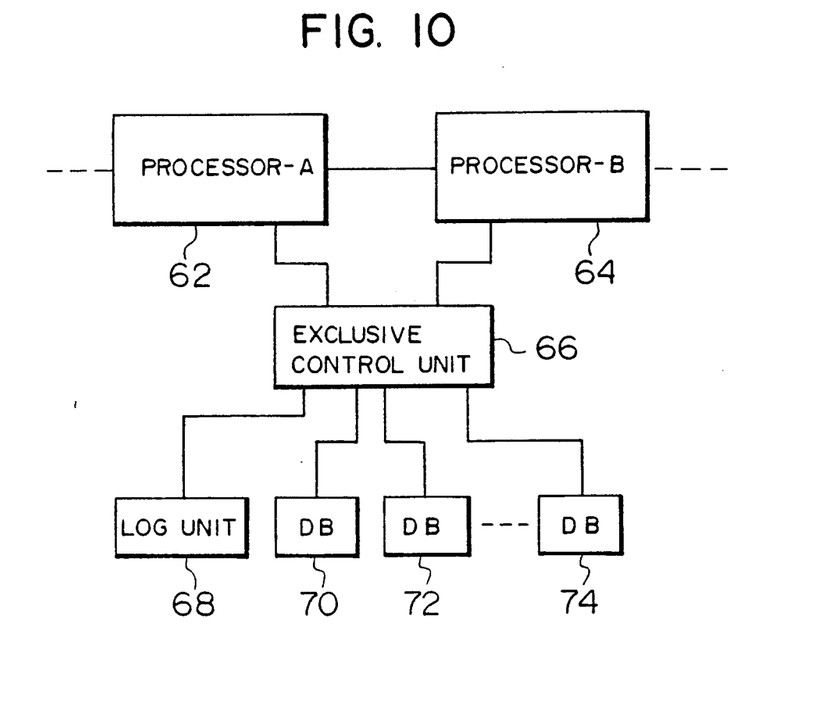

A further embodiment is shown in FIG. 10. In this embodiment, exclusive control functions of each access control section, that is, an exclusive control function for respective user programs and an exclusive control function for the database units are totally provided as an exclusive control unit 66. Therefore, requests from the respective executing sections are transmitted to the section 66 by the access controlling section of the respective processors. The section 66 is connected to a log unit 68 and database units 70, 72, and 74, whereby the log can be unitarily managed, and therefore the respective executing sections of the respective processors solely issue requests.

Thus, the present invention has been explained in detail. Although in the first embodiment an explanation has been given of a case where the access controlling section performs the exclusive control relative to requests issued by the respective executing sections, such exclusive control may not been performed of course. Also, it is possible to perform requests which do not need the exclusive control, that is, not only the search request but also other various requests without the exclusive control. A group of requests which need the exclusive control and a group of requests which do not need the exclusive control may be previously determined according to whether or not contents of the database is to be updated, and those needing the exclusive control may be performed by a processor which manages the concerned database. In this case, even with a request of the group of requests which do not need the exclusive control, if a data change is undesired during processing for the request, the exclusive control may be performed until commit processing or return processing is completed. However, the data change during processing for the request is acceptable, other request processing may be performed irrespective of the commit processing or the return processing.

What is claimed is:

1. A database system comprising:

database means for storing a database;

managing processor means coupled to said database means, for managing said database means and selectively performing exclusive control to access said database means in response to an inputted particular request; and, processor means coupled to said database means and to said managing processor means for generating a first database access request in accordance with a user program executed in the processor means, the processor means including:

means for i) directly accessing said database means in accordance with the generated database access request regardless of the exclusive control of said processor means over said database means when the first generated database access request is a first one of a first predetermined request type not accompanying a write operation to said database, and ii) outputting the first generated database access request to said managing processor means as the particular request when the generated database access request is a second one of a second predetermined request type accompanying a write operation to said database to indirectly access said database means through said managing processor means exclusively controlling said access to said database means; and, means for outputting the first database access request as the particular request to said managing processor means in response to an error in a previous direct access to said database means when the first generated database access request is the first one of the first predetermined request type.

2. The database system according to claim 1, wherein said processor means further comprises means for directly accessing said database means in response to an error in a previous direct access to said database means when the first generated database access request is the first one of the first predetermined request type.

3. The database system according to claim 1 wherein said processor means includes means for i) directly accessing said database means in accordance with the first generated database access request regardless of the exclusive control of said processor means over said database means when the first generated database access request is a read/request-only request type and ii) outputting the first generated database access request to said managing processor means as the particular request when the generated database access request is a write/update request type.

4. A method of sharing a database between a plurality of processors with less overhead in a database system, the method comprising the steps of:
generating a first search request in accordance with a user program executed in a first processor of the plurality of processors;
managing selective exclusive access control over said database with a second processor of said plurality of processors;
directly accessing the database by said first processor without exclusive control over the database in accordance with the generated first search request when the generated first search request is one of a plurality of first predetermined requests not accompanying a write operation to the database;
transmitting the generated first search request from the first processor to the second processor as a particular request when the generated first search request is one of a plurality of second predetermined requests accompanying a write operation to the database;
indirectly accessing the database by the first processor, through said second processor with the exclusive control, in response to the particular request;
examining whether consistency exists between data searched in accordance with the first search request and first storage managing information of the data, the generated first search request being a request included in the plurality of first predetermined requests not accompanying a write operation to the database;
transmitting the first search request is the particular request from the first processor to the second processor when the inconsistency is detected; and,
transmitting the searched data from the second processor to the first processor.

5. The method according to claim 4, further comprising the steps of:
examining whether an inconsistency exists between second data searched for in accordance with a second search request and second storage managing information of the second data, the generated second search request being a search request included in the plurality of first predetermined request; and,
re-accessing the database in accordance with the second search request when the inconsistency is detected.

6. The method of sharing a database according to claim 4 wherein:
said directly accessing step includes directly accessing the database by said first processor without exclusive control over the database in accordance with the generated first search request is a read/request-only access request type; and,
said indirectly accessing step includes indirectly accessing the database by the first processor through said second processor with the exclusive control in response to said particular request being a write/update access request type.

7. A database system comprising:
database means for storing a database;
log means for storing database access log;
managing processor means coupled to said database means and to said log means, for managing said database means, generating a first request in accordance with a first user program executed in the managing processor means, accessing said database means in accordance with the generated first request, receiving a particular request to access said database means in response to the received particular request, and updating the database access log in said log means when one of the first request and the particular request is one of a group of first predetermined requests associated with update processing of said database; and
processing means coupled to said database means, said log means and said managing processor means, for generating a second request in accordance with a second user program executed in the processor means, directly accessing said database means in accordance with the generated second request when the generated second request is one of a group of second predetermined requests, processing for each of said group of second predetermined requests incurring no change in contents of said database, transmitting the generated second request to said managing processor means as the particular request when the generated second request is one of said group of first predetermined requests;
the processor means comprising means, when the generated second request is a first search request included in said group of second predetermined requests, for i) transmitting the first search request as the particular request to said managing processor means, when a contradiction is detected between data searched for in accordance with the first search request and first storage managing information of the data, and for ii) receiving the searched data from said managing processor means; and
said managing processor means comprising means for accessing said database means in response to the first search request to transmit the searched data to said processor means.

8. The database system according to claim 7, wherein the processor means further comprises means, when the generated second request is a second search request included in said group of second predetermined requests, for re-accessing said database means in accordance with the second search request when a contradiction is detected between data searched for in accordance with the second search request and second storage managing information of the data in said database system.

9. A database system comprising: database means for storing a database; exclusive control means responsive to an inputted access request, for performing exclusive control over said database means and granting an access permission;

managing processor means coupled to said database means and to said exclusive control means, for managing said database means, generating a first request for access to said database in accordance with a first user program executed in the managing processor, directly accessing said database means in accordance with the generated first request when the generated first request is one of a first request group, wherein processing for each request in said first request group results in no change in the contents of the said database, outputting one of the first request generated in the managing processor means and particular request inputted into the managing processor means to said exclusive control means to acquire said access permission when the generated first request is one of a second request group, each request in said second request group being associated with an update processing of said database, and indirectly accessing said database means through said exclusive control means in accordance with said access permission and one of the generated first request belonging to said second request group and the particular request; and, processing means coupled to said database means, said exclusive control means and said managing processor means, for generating a second request in accordance with a second user program executed in the processing means, directly accessing said database means in accordance with the second request when the generated second request is one of said first request group and outputting the generated second request to said managing processor means as the particular request indirectly accessing said database means through said exclusive, control means when the generated second request is one of said second request group;

wherein said processing means comprises means, when the generated second request is a first search request included in the first request group, for outputting the first search request as the particular request to said managing processor means when a contradiction is detected between data searched for in accordance with the first search request and managing information of the data in said database means, and for receiving the searched data from said managing processor means; and said managing processor means further comprising means for searching said database means for data to transmit the searched data to said processing means.

10. The database system according to claim 9, further comprising log means coupled to said managing processor means for storing a database access log, and wherein said managing processor means further comprises means for updating the database access log in said log means when said database means is accessed in accordance with said access permission and one of the generated first request and the particular request.

11. The database system according to claim 9, wherein said processing means further comprises means, when the generated second request is a second search request included in said first request group, for re-accessing said database means in accordance with the second search request when a contradiction is detected between data searched for in accordance with the second search request and managing information of the data in said database system.

12. A method of sharing a database with reduced overhead in a database system, the method comprising the steps of:

generating requests in accordance with user programs executed by each of plurality of processors;

examining whether each generated request is one of a predetermined request group associated with a write operation to the database;

executing processing associated with the generated requests for the database, while performing exclusive control by a managing processor which manages the database, when the generated requests are one of the predetermined request group associated with the write operation to the database;

directly executing the processing associated with the generated requests for the database by each processor of the plurality of processors which generates the requests, without performing the exclusive control by the managing processor, when the generated request is not one of the predetermined request group associated with the write operation to the database;

examining whether a contradiction exists between data searched for in accordance with a generated first search request and managing information of the data, the generated first search request not being a search request included in the predetermined request group; and, executing processing associated with the first search request for the database by the managing processor while executing the exclusive control for obtaining data as a search request included in the predetermined request group when the contradiction is detected.

13. The method according to claim 12, further comprising the steps of:

examining whether a contradiction exists between data searched for in accordance with a generated second search request and managing information of the data, the generated second search request not being a search request included in the predetermined request group; and, re-accessing the database in accordance with the second search request when the existence of the contradiction is detected.

14. The method according to claim 12, further comprising the step of designating whether said first granted search request is to be removed from said predetermined request group when processing associated with the request includes commit processing the first generated search request being originally included in said predetermined request group.

15. A database system comprising:

database storage means for storing a database;

managing processor means coupled to said database storage means, for selectively and exclusively managing said database storage means by selectively and exclusively controlling updates to said database responsive to a first update request; and, processor means coupled to said database storage means and to said managing processor means for executing a program for processing data, the processor means including i) means for directly accessing said database in accordance with said program executed when the access is a read-type access, ii) means for indirectly accessing said database through said managing processor means in accordance with said program executed when the access is an update-type access by generating said first update request before update-type accessing the database, and iii) means for indirectly accessing said database through said managing processor means in accordance with said program executed when the access is a read-type access in response to an access error being detected in a previous direct access.

16. The database system according to claim 15 further comprising log means, coupled to said managing processor means, for storing a log record of update-type accesses to said database by said processor means.

17. The database system according to claim 16 wherein said processor means comprises a plurality of data processors, each coupled to said database storage means and to said managing processor means and each for executing a program for processing data, each processor means including means for directly accessing said database in accordance with said program executed therein when the access is a read-type access and means for indirectly accessing said database through said managing processor means in accordance with said program executed therein when the access is an update-type access by each generating said first update request before update-type accessing the database.

18. The database system according to claim 17 wherein said log means coupled to said managing processor means includes means for storing a log record of update-type accesses to said database by each of said plurality of data processors.

19. A database system comprising:

first database storage means for storing a first database;

second database storage means for storing a second database;

first managing processor means coupled to said first and second database storage means, for exclusively managing said first database storage means by selectively and exclusively controlling updates to said first database responsive to a first update request;

second managing processor means coupled to said first and second database storage means, for selectively and exclusively managing said second database storage means by exclusively controlling updates to said second database responsive to a second update request;

first processor means in said first managing processor means for executing a first program for processing data, the first processor means including i) means for directly accessing said first and second database storage means in accordance with said first program executed when the access is a read-type access, ii) means for indirectly accessing said first and second database storage means through said first and second managing processor means respectively in accordance with said first program executed when the access in an update-type access by generating said first update request before update-type accessing the first and second database storage means and iii) means for indirectly accessing said first and second database storage means through said first and second managing processor means respectively in accordance with said first program executed when the access is a read-type access in response to an access error being detected in a previous direct access; and, second processor means in said second managing processor means for executing a second program for processing data, the second processor means including i) means for directly accessing said first and second database storage means in accordance with said second program executed when the access is a read-type access, ii) means for indirectly accessing said first and second database storage means through said first and second managing processor means respectively in accordance with said second program executed when the access is an update-type access by generating said second update request before update-type accessing the first and second database storage means and iii) means for indirectly accessing said first and second database storage means through said first and second managing processor means respectively in accordance with said second program executed when the access is a read-type access in response to an access error being detected in a previous direct access.

20. The database system according to claim 19 further comprising:

first log means, coupled to said first managing processor means, for storing a first log record of update-type accesses to said first database by said first and second processor means; and, second log means, coupled to said second managing processor means, for storing a second log record of update-type accesses to said second database by said first and second processor means.

* * * * *

UNITED STATES PATENT AND TRADEMARK OFFICE
CERTIFICATE OF CORRECTION

PATENT NO. : 5,329,628
DATED : July 12, 1994
INVENTOR(S) : Shoji Yamamoto, et al.

It is certified that error appears in the above-indentified patent and that said Letters Patent is hereby corrected as shown below:

Claim 4, column 9, line 59, delete "is" and substitute therefor --as--.

Claim 9, column 11, line 40, delete "the" and substitute therefor --said--.

Claim 9, column 11, line 58, delete ";" and substitute therefor --,--.

Claim 12, column 12, line 16, before "plurality" insert --a--.

Claim 14, column 12, line 58, delete "granted" and substitute therefor --generated--.

Claim 14, column 12, line 61, after "processing" insert --,--.

Signed and Sealed this

Fifteenth Day of November, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,329,628
DATED : July 12, 1994
INVENTOR(S) : Shoji Yamamoto, et al It is certified that error appears in the above-indentified patent and that said Letters Patent is hereby corrected as shown below:

Column 10, line 13, claim 6, after "search request" insert —when the generated first search request.

Signed and Sealed this

Thirteenth Day of December, 1994

Attest:

BRUCE LEHMAN

Attesting Officer     Commissioner of Patents and Trademarks